April 29, 1952  F. O. HESS ET AL  2,594,433
SEWAGE TREATMENT
Filed June 20, 1946  4 Sheets-Sheet 1

INVENTORS
Frederic O. Hess
Marcus B. Tank
Edwin R. Schofield
BY
their ATTORNEY

WITNESS

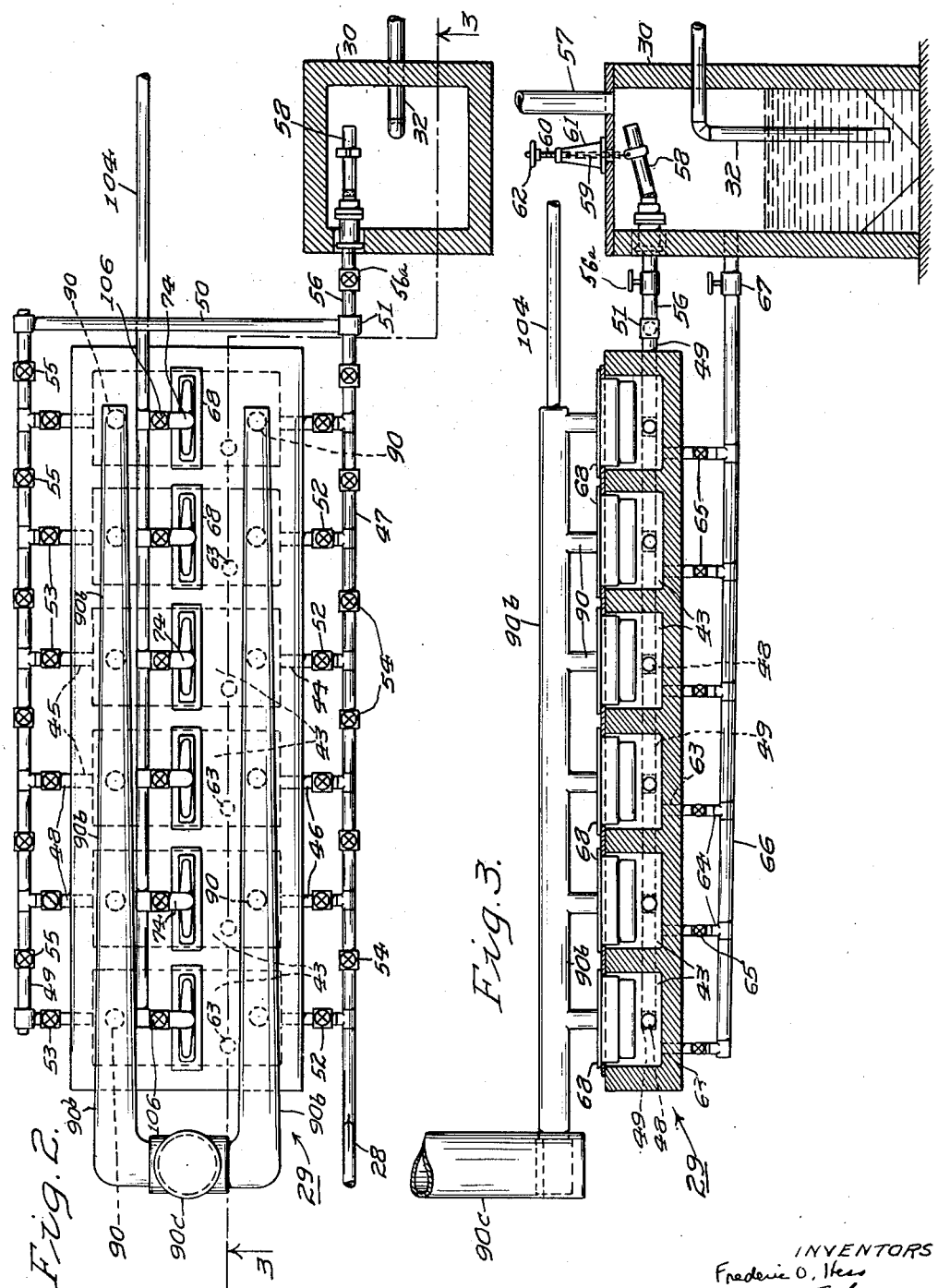

April 29, 1952
F. O. HESS ET AL
2,594,433
SEWAGE TREATMENT
Filed June 20, 1946
4 Sheets-Sheet 3
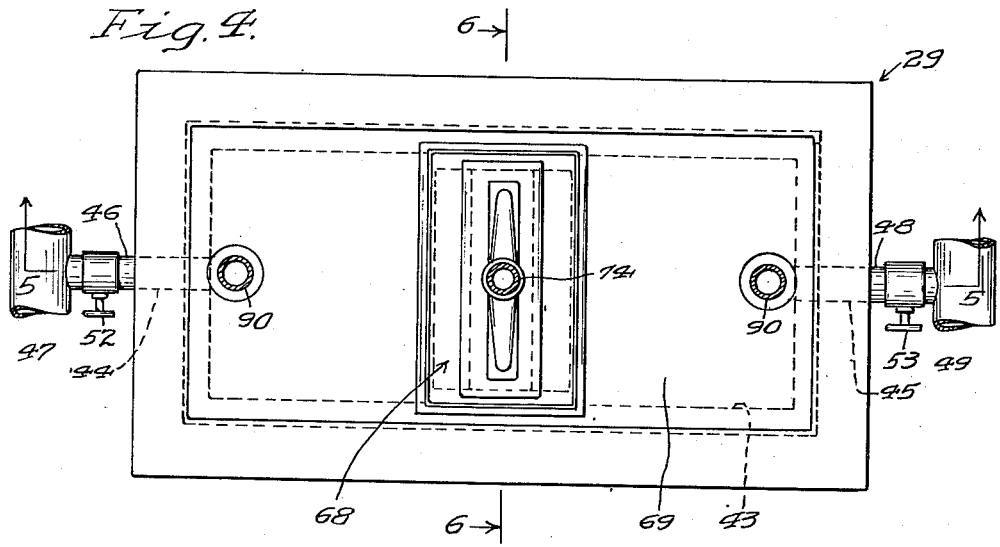
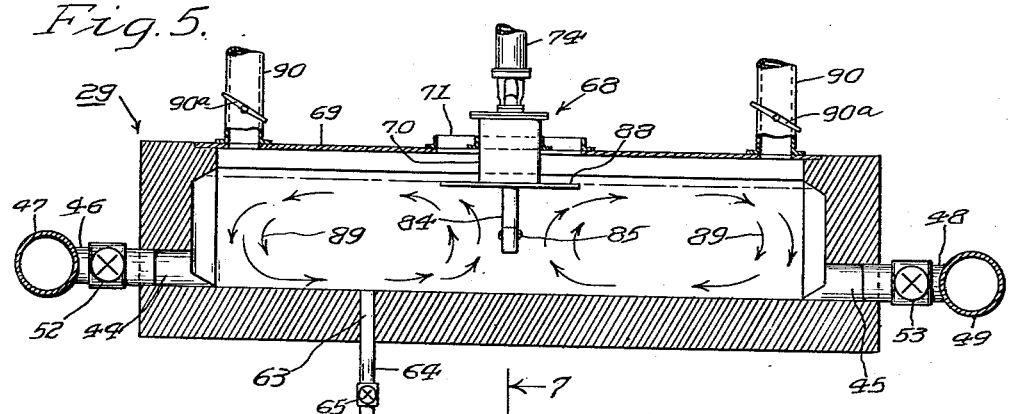
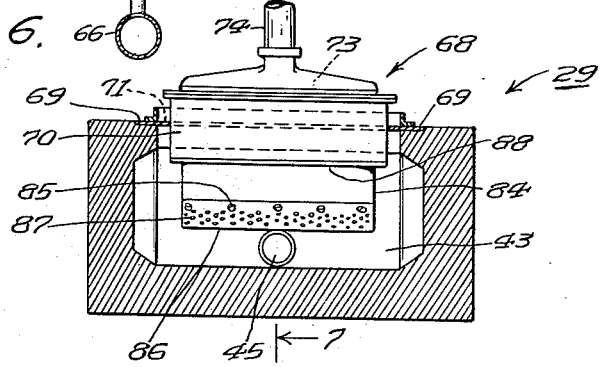

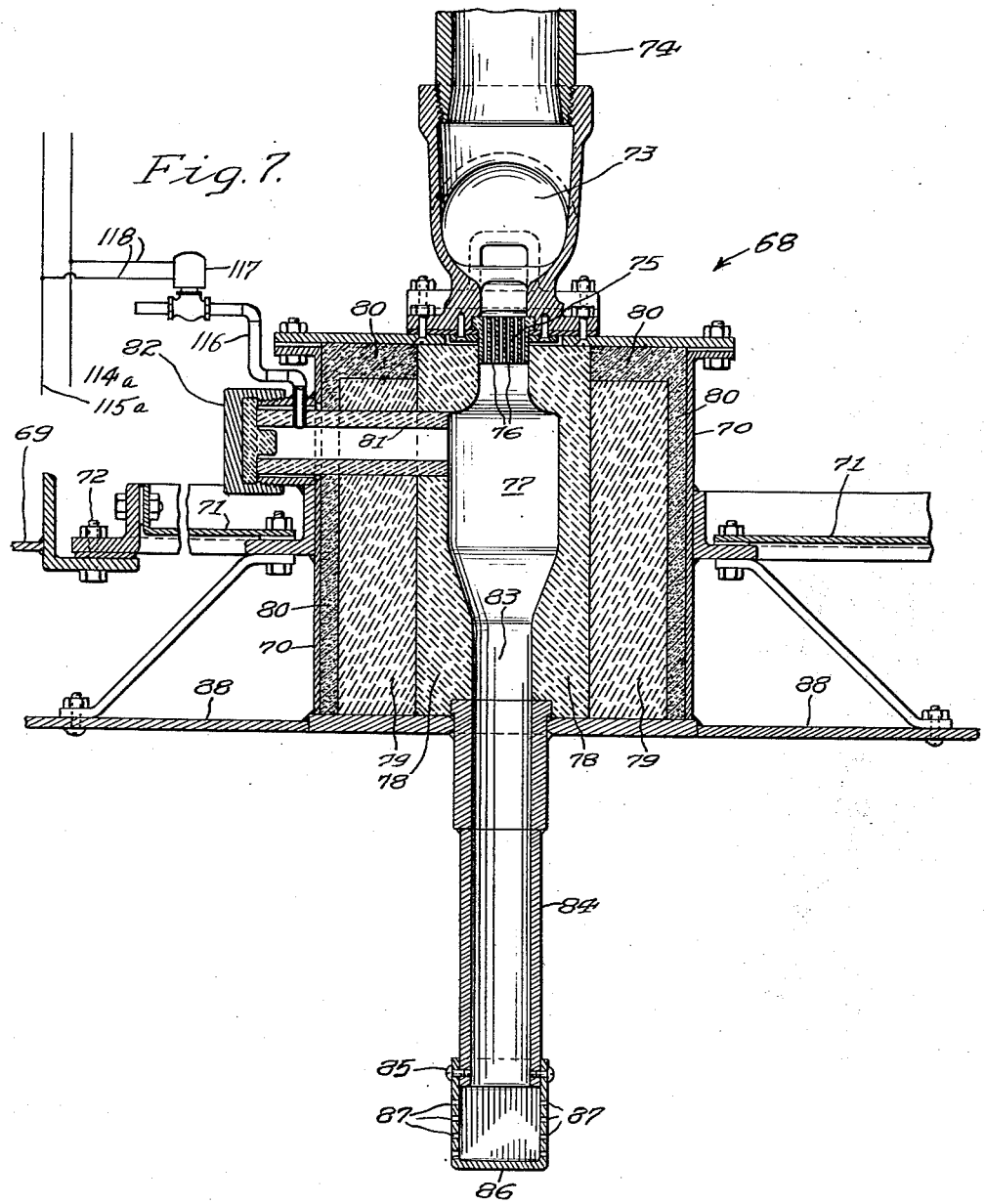

Patented Apr. 29, 1952

2,594,433

UNITED STATES PATENT OFFICE 2,594,433

SEWAGE TREATMENT

Frederic O. Hess, Marcus B. Tark, and Edwin R. Schofield, Philadelphia, Pa., assignors to Selas Corporation of America, Philadelphia, Pa., a corporation of Pennsylvania Application June 20, 1946, Serial No. 678,096

9 Claims. (Cl. 210—2)

This invention relates to sewage treatment and is especially concerned with a system and method for treating sludge in sewage treating plants.

It has already been proposed to effect heating of sludge in digestion tanks by introducing hot water or hot sludge liquor into the bottom of the tanks, and, after such heating medium has given up its heat to the sludge, to withdraw such introduced liquid from the top of the tanks along with the supernatant liquid or sludge liquor produced during digestion of the sludge. Heating sludge in this manner is objectionable in that it not only thins out the sludge undergoing digestion, but also increases the quantity of supernatant liquid that must be handled in the sewage treating plant, especially when hot water is employed as the heating medium.

It has also been suggested to heat sludge entering the digestion tanks by passing the sludge in heat exchange relation and out of physical contact with a heating medium in a suitable heat exchanger. Heating sludge in this manner has not been satisfactory because the sludge cannot be heated above a definite elevated temperature in the neighborhood of about 140° F. in order to prevent caking of sludge in the heat exchanger. Moreover, controlling the temperature of the sludge undergoing digestion in the tanks is often difficult when such a heat exchanger is relied upon to effect heating of sludge passing to the digestion tanks.

As a consequence, it has generally been the practice to heat sludge in digestion tanks with the aid of hot water circulating through pipes or coils fixed in the tanks. In order to prevent caking of sludge on the exterior surfaces of the pipes or coils, the hot water cannot exceed a definite elevated temperature in the neighborhood of about 125° F. to 140° F., thereby limiting the thermal head of the heating medium and hence the rate at which heat is given up to the sludge. Further, the rate at which heat is given up to the sludge is limited by the heat transfer surface presented by the pipes or coils. Even when hot water is circulated through the pipes or coils at temperatures normally considered practicable, caking of sludge gradually takes place at the exterior surfaces of the pipes or coils, thereby reducing and retarding heat transfer to the sludge undergoing digestion in the tanks.

In addition, when pipes or coils are fixed in digestion tanks for heating sludge therein, the pipes also become corroded and eventually require cleaning and ultimate replacement. When this occurs all of the sludge must be removed from the digestion tanks. Such maintenance operations are disagreeable and costly and the replacement of pipes or coils may upset the operation of a sewage treatment plant for many months.

In accordance with the present invention an improvement is provided for efficiently digesting sludge which overcomes the aforementioned objections and disadvantages encountered heretofore. This is accomplished by bringing into direct physical contact with the sludge a high temperature gaseous heating medium which is not absorbed or taken up by the sludge. In this manner immense quantities of heat can be quickly given up to and absorbed by the sludge from the heating medium, which is in direct physical contact therewith and at a high thermal head, whereby rapid heating of the sludge to any desired temperature can be effected.

The heating of sludge in the manner just described with the aid of a heating unit is preferably accomplished at a place entirely outside the digestion tank and in the path of flow of the sludge passing to the digestion tank from the settling or sedimentation tank from which the sludge is withdrawn. At such place of heating the high temperature gaseous heating medium is discharged at a sufficiently rapid velocity beneath the liquid surface level of the sludge passing therethrough, so that violent agitation of the sludge occurs to prevent settling out of the larger sludge particles. The violent agitation of the sludge at the place of heating also causes the circulating sludge to sweep rapidly over the exposed surfaces of the portion of the heating unit submerged in the sludge and from which the heating gases are discharged, thereby effectively dislodging and removing any solid sludge particles tending to adhere or cling to the exposed surfaces of the submerged portion of the heating unit.

In heating sludge in accord with the invention, therefore, a heating unit is provided entirely outside the digestion tank which can be readily installed and is economical to operate and capable of heating sludge to any desired temperature over a wide temperature range for most efficient sludge digestion, without encountering objectionable caking of sludge on the heating unit and at the place of heating.

While the high temperature heating gases brought in surface contact with the sludge may consist of heated exhaust gases from an internal combustion engine or from any other suitable source, sludge has been successfully heated in accord with the invention by heating units of a type having a refractory lined combustion chamber in which substantially complete combustion of a combustible gas mixture is accomplished and from which heated products of combustion are discharged through restricted outlets beneath the liquid surface level of the sludge at temperatures as high as 2200° F. to 2400° F. and higher and at velocities as high as 400 to 500 feet per second. The gas produced during digestion of the sludge may be employed as the combustible fuel, if desired, and such gas may be mixed with combustion supporting air to provide the combustible gas mixture for one or more heating units arranged to heat sludge in its path of flow to the digestion tanks.

While the supply of the combustible gas mixture delivered to the heating units may be controlled to regulate the heating of the sludge, the extent to which the sludge is heated can also be nicely controlled by providing a number of sludge channels alongside one another, each of which may have one or more heating units associated therewith, and controlling the manner in which the sludge passes through the channels. Thus, the sludge may be caused to pass serially through all of the channels or in parallel flow therethrough or in any series-parallel flow arrangement desired, so as to effect the requisite heating of the sludge.

It is an important consideration in heating sludge in accord with the invention to pass the sludge through the place of heating at a regulable rate of flow. In this way the desired uniform heating of the sludge is assured to maintain the sludge at the requisite temperature in the digestion tank. In addition, the extent to which the sludge is heated by the gaseous medium introduced therein is controlled by adjustment of the liquid surface level of the sludge at the place of heating. This is accomplished by causing sludge to overflow from the place of heating, as over an adjustable weir, for example, into a suitable sump or reservoir. From such sump or reservoir the heated sludge is delivered at a sufficient velocity through a supply line to the digestion tank so that settling of heavy sludge particles is prevented.

The novel features which are believed to be characteristic of the invention are set forth with particularity in the claims. The invention, both as to organization and method, together with the objects and advantages thereof, will be better understood by reference to the following description taken in connection with the accompanying drawings, in which:

Fig. 2 is an enlarged top plan view, partly broken away and in section, of a portion of the sewage treating system shown in Fig. 1 to illustrate parts thereof more clearly, especially the sludge heating apparatus and sump associated therewith;

Fig. 3 is a vertical sectional view taken at line 3—3 of Fig. 2;

Fig. 4 is an enlarged top plan view of one of the channels of the sludge heating apparatus shown in Figs. 1 to 3 inclusive;

Figure 1:
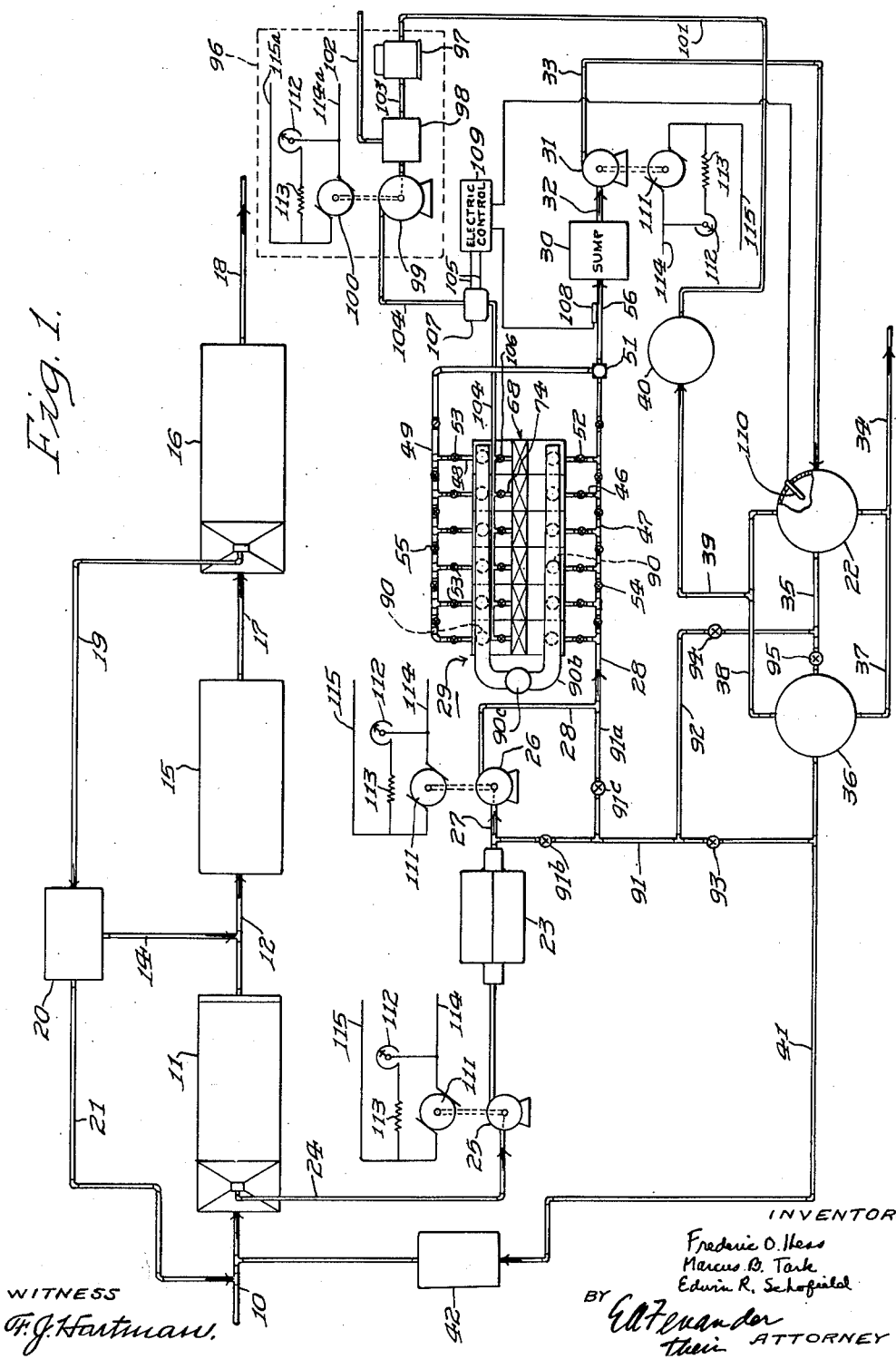
Fig. 1 is a view more or less diagrammatically illustrating a sewage treating system embodying the invention.

Figs. 5 and 6 are longitudinal and transverse sectional views taken at lines 5—5 and 6—6 of Fig. 4; and Fig. 7 is an enlarged vertical sectional view, taken at line 7—7 of Fig. 6, to illustrate more clearly the sludge heating units associated with each of the channels of the sludge heating apparatus.

Although not to be limited thereto, the present invention for treating sludge is shown in Fig. 1 in connection with a system for treating sewage by the activated sludge process. Such a sewage treatment system is diagrammatically illustrated in Fig. 1 in which specific types of conventional equipment and auxiliary apparatus are not shown for the purpose of simplifying the drawings. The raw sewage or influent received at the plant, and from which large matter essentially inorganic is removed in any conventional manner, passes through a conduit 10 into a primary sedimentation or settling tank 11.

The settleable solids of suspended matter are settled in the primary sedimentation tank 11, and the raw sewage effluent flows therefrom into a conduit 12. Returned activated sludge also passes into the conduit 12 from a conduit 14 to provide mixed liquor which is discharged into an aeration tank 15. In the aeration tank 15 the mixed liquor is aerated, thereby promoting biological treatment for rapidly converting into settleable sludge non-settleable organic matter in the raw sewage, which is in the form of finely divided, colloidal or soluble substances.

A secondary sedimentation or settling tank 16 receives the effluent from the aeration tank 15 through a conduit 17. The activated sludge formed as the result of the biological treatment effected in the aeration tank 15 is settled out in the sedimentation tank 16, and the final effluent is discharged therefrom through a conduit 18 for disposal in any conventional manner.

The activated sludge is removed from the secondary sedimentation tank 16 and pumped back to the aeration tank 15 as returned sludge, the path of flow for such returned sludge including conduit 19, a distribution box 20 and the conduit 14 from which the sludge is discharged into raw sewage passing through the conduit 12 into the aeration tank 15. The distribution box 20 may be of any well known type, having an adjustable weir, for example, for accurately controlling and adjusting the amount of sludge returned to the aeration tank 15 to obtain the desired concentration of returned sludge in the raw sewage undergoing secondary treatment.

The excess sludge not required for secondary treatment in the aeration tank 15 passes from the distribution box 20 through a conduit 21 back to the conduit 10 and mixes with the raw sewage before the latter enters the primary sedimentation tank 11. The excess sludge returned to the primary sedimentation tank 11 settles therein with the primary sludge. The mixture of primary sludge and activated sludge settling in the primary sedimentation tank 11 is collected therein and delivered to a primary digestion tank 22, as will be described presently.

In accordance with the invention sludge removed from the primary sedimentation tank 11 is heated in its path of flow to the primary digestion tank 22 by bringing a high temperature gaseous heating medium into contact therewith at a place of heating before the sludge passes into the digestion tank 22. In the embodiment illustrated this is accomplished by delivering sludge from the tank 11 to sludge storage tanks 23 through a conduit 24 in which is connected a pump 25. The inlet of a pump 26 is connected by a conduit 27 to the storage tanks 23 for withdrawing sludge therefrom, and such withdrawn sludge is discharged from the outlet of pump 26 through a conduit 28 to heating apparatus 29 in which the sludge is heated, as will be described more fully hereinafter.

The heated sludge passes from the heating apparatus 29 into a sump or reservoir 30 to which a pump 31 is connected by a conduit 32 for delivering the heated sludge through a conduit 33 to the primary digestion tank 22. The sludge in the tank 22 is digested by the anaerobic decomposition of the organic matter present, and the digested sludge tends to settle or collect at the bottom of the tank from which region the digested sludge is withdrawn through a conduit system 34 for disposal in any conventional manner, as to sludge drying beds or to a lagoon, for example.

The supernatant liquid or sludge liquor produced as the result of sludge digestion may be passed from the primary digestion tank 22 through a conduit 35 to a secondary digestion tank 36. The organic matter present in the supernatant liquid introduced into the secondary digestion tank 36 is digested therein, and the digested sludge formed is deposited at the bottom of this digestion tank from which region the digested sludge may be withdrawn through a conduit 37 communicating with the conduit system 34.

The gases produced in the digestion tanks 22 and 36 as the result of sludge digestion, which gases are rich in methane, are withdrawn from the upper parts of the digestion tanks through conduits 38 and 39 and delivered to a suitable gas holder 40.

Supernatant liquid may be passed through a conduit 41 from the secondary digestion tank 36 to the conduit 10 and mixed with raw sewage influent before the latter enters the primary sedimentation tank 11. An aeration tank 42 may be provided in the conduit 41 for aerating the supernatant liquid, so as to satisfy the high immediate demand for oxygen, before such liquid is mixed with the raw sewage influent in the conduit 10.

The heating apparatus 29, in which heating of sludge is effected in its path of flow to the primary digestion tank 22, comprises structure providing a plurality of flow passages or channels 43 disposed alongside one another. The channels 43 at opposite ends thereof are provided with openings 44 and 45 for introducing and discharging sludge into and from the channels at regions closely adjacent to the channel bottoms. The opening 44 at one end of each channel 43 is connected by a branch pipe 46 to a manifold 47 which in turn is connected to the conduit 28 through which raw sludge is delivered from the sludge storage tanks 23. The opening 45 at the opposite end of each channel 43 is connected by a branch pipe 48 to a manifold 49 which in turn is connected by a pipe 50 to an end of the manifold 47, as indicated at 51, which is removed from the inlet end to which raw sludge is delivered through the conduit 28.

To control the manner in which sludge passes through the channels 43, as will be described presently, valves 52 and 53 are provided in the branch pipes 46 and 48, respectively; and the valves 54 and 55 are provided in the manifolds 47 and 49, respectively. A pipe 56 having a valve 56a therein is connected to the manifold 47 at 51 for passing heated sludge into the sump 30 which is provided with a vent pipe 57 adapted to extend through the roof of the enclosure in which the sludge treatment equipment being described is installed.

In order to control the liquid surface level of the sludge in the channels 43, a discharge spout 58 is provided in the upper part of the sump 30 which is flexibly connected in any suitable manner to the pipe 56. To the spout 58 is connected one end of a chain 59 whose opposite end is fixed by a suitable universal connection to a screw 60. The screw 60 is axially movable in a threaded opening formed in the upper part of a hollow dome 61 provided at the top of the sump. To the portion of the screw projecting upwardly through the opening in the dome 61 is secured a hand wheel 62 or the like, whereby the screw may be manually moved up and down to adjust the vertical position of the discharge end of the spout 58 and hence maintain the sludge at any desired level in the channels 43.

In order to drain sludge from channels 43 when this is desired or becomes necessary, the bottom of each channel is formed with an outlet 63 to which is fixed a branch pipe 64 in which is connected a valve 65. The branch pipes 64 are connected to a manifold 66 which communicates with an opening in a side wall of the sump 30, such manifold 66 sloping downwardly toward the sump to facilitate draining of sludge from the channels 43. A valve 67 is connected in the drain manifold 66 at a region adjacent to the sump 30.

By providing the valves 52 and 53 in the branch pipes 46 and 48 and the valves 54 and 55 in the manifolds 47 and 49, the sludge to be heated may be passed through the channels 43 in any desired manner. For example, when the appropriate valves are opened and closed, all of the channels may be connected in series so that all of the sludge will pass successively through each of the channels; or adjacent pairs of channels 43 may be connected in parallel and successive pairs of channels connected in series. By closing and opening the appropriate valves, therefore, the sludge may be caused to pass in series or in parallel through the channels or in any series-parallel flow arrangement desired.

In the preferred embodiment illustrated, combustion of a combustible gas mixture is effected in heating units 68 and heated products of combustion are discharged therefrom at a high temperature and at a relatively high velocity into the sludge to effect heating thereof while passing through the channels. The heating units 68 are adapted to be positioned at centrally disposed openings formed intermediate the ends of cover plates 69 provided for the channels 43.

Each heating unit 68 comprises an elongated shell or outer casing 70 which is adapted to extend transversely of one of the channels 43 between the side walls thereof. The casings 70 are provided with skirts 71 which extend about the entire peripheries of the heating units and are wider at the longer side walls of the casings than the end walls thereof. The casings 70 and skirts 71 associated therewith serve as closure members for the central openings in the cover plates 69 and are bolt connected thereto, as indicated at 72.

Each heating unit includes structure providing an elongated inlet chamber 73 having a centrally disposed threaded opening at the upper part thereof to which is connected a conduit 74 through which a combustible gas mixture is delivered from a source of supply. At the narrow bottom portion of the inlet chamber 73 is positioned a screen member 75 which extends into the upper part of the casing 70 and is formed with a plurality of apertures 76 for subdividing the combustible gas streams.

The small gas streams are discharged from the apertures 76 into a combustion space 77 formed by a cavity of a hollow body positioned within the casing 70. The hollow body may comprise a number of refractory parts 78 and 79 rigidly secured in position within the shell 70 with the aid of a heat insulating lining 80 formed of suitable material, such as asbestos, for example. A hollow refractory sleeve member 81 communicating with the combustion space 77 and extending exteriorly of the casing 70 forms an ignition port. Such ignition port facilitates igniting the gas streams in the combustion space 77 and is provided with a removable closure member 82.

In order to withstand the high temperatures produced in the combustion space 77 when combustion is being effected therein, the inner refractory wall parts 78 and hollow sleeves 81 may be formed of a suitable refractory material, such as silicon carbide, for example, having high resistance to thermal shock and possessing rigidity and strength at high temperatures. The outer refractory wall parts 79 of the hollow body are preferably formed of a refractory material, such as aluminum oxide, for example, possessing good insulating properties. The screen member 75 may comprise a number of blocks in abutting relation which are formed of a suitable refractory material, such as aluminum oxide, for example.

Substantially complete combustion of the gas streams is effected in the combustion space 77 which terminates at its lower end in a restricted discharge orifice 83. To the apertured bottom of the casing 70 is fixed the upper end of an elongated hollow metal shell 84 which is relatively narrow and of considerable depth and constitutes the portion of each heating unit 68 adapted to be submerged in the sludge passing through the channels 43.

The shell 84 provides a narrow passage which communicates at its upper end with the restricted discharge orifice 83 and is of substantially the same size and cross section as the latter. To the lower end of the shell 84 is removably secured at 85 a hollow metallic head 86 which is U-shaped in cross section and provided with a plurality of small discharge ports 87 in the opposing side walls thereof through which the high temperature heated products of combustion are discharged into the sludge.

The heating units 68 are preferably positioned across the channels 43 so that the bottoms of the casings 70 are approximately at the liquid surface level of the sludge and in surface contact therewith. To each longer side wall of the casings 70, adjacent to the bottoms thereof, are fixed horizontally disposed baffle plates 88. The baffle plates 88 and bottoms of the casings 70 together form an imperforate roof immediately above the region at which heated gases are discharged into the sludge through the discharge ports 87.

When a combustible gas mixture is supplied under reduced pressure through the conduits 74 to the inlet chambers 73 of the heating units and subdivided into a plurality of gas streams by the apertures 76 in the screen members 75, such gas streams may be ignited by momentarily removing the closure members 82 of the ignition ports and inserting a suitable igniting torch or burner into the combustion spaces 77. When ignition is effected, a plurality of flames are produced and maintained at the lower ends of the apertures 76 at which time the pressure of the gaseous mixture delivered to the heating units 68 may then be increased.

After a short interval of time the flames maintained at the bottom surfaces of the screen members 76 effect such heating of the inner refractory linings of the combustion spaces 77 that these surfaces are heated to a high incandescent temperature. The heating of the inner refractory linings to a highly incandescent condition and the radiant heat therefrom promotes substantially complete combustion of the gas mixture in the combustion spaces 77 before the mixture leaves the discharge orifices 83. From the discharge orifice of each heating unit 68 is discharged a high velocity jet or stream of heated gases at a temperature nearly equal to the temperature in the combustion space 77 and consisting substantially entirely of heated products of combustion.

The heated products of combustion pass downwardly through the narrow passages formed by the shells 84 into the heads 86 and are discharged through the ports 87 therein into the sludge at an elevated temperature approaching the temperature prevailing in the combustion space 77. Such heated gases introduced into the sludge are at an elevated temperature ranging from about 2200° F. to 2400° F. when a combustible gas mixture of air and ordinary combustible gas, having a B. t. u. rating of about 550 B. t. u. per cubic foot, for example, is delivered at a pressure in the neighborhood of three pounds per square inch. Under such operating conditions the pressure in the combustion spaces 77 may be equivalent to a pressure corresponding to 55 to 70 inches of water column and appreciably above the pressures existing at the regions the heated gases are discharged into the sludge, which is atmospheric pressure plus the pressure head of a column of liquid sludge of a height equivalent to the depth to which the bottom portions of the heating units 68 are submerged in the sludge. The heated gases are discharged from the ports 87 at velocities as high as 400 to 500 feet per second.

The submerged portions of the heating units 68 preferably extend a major portion of the distance between the side walls of the channels 43. In the drawings the channels 43 shown were scaled from actual working drawings of a channel and heating unit therefore in which the width of the channel is about 55 inches and the submerged portion of the heating units is about 42 inches long. Vigorous circulation of the sludge passing through the channels 43 is effected by the high temperature heating gases discharged through the ports 87. The sludge passing through the channels 43 is circulated more or less in the manner indicated by the arrows 89 shown in Fig. 6.

Since the heated gases tend to rise immediately upward through the sludge at the regions such gases are discharged therein, the baffle plates 88 are provided which, together with the bottoms of the casing 70, form the imperforate roofs which extend for a considerable distance lengthwise of the channels in both directions from the regions the heated gases are discharged into the sludge. The heating units 68 are preferably positioned so that the roofs just described are immersed in the sludge at the liquid surface level. In this way the heated gases discharged into the sludge and rising through the latter must pass beneath the roofs toward the ends of the channels and further induces the desired directional movement of the sludge to promote violent circulation and agitation thereof.

By inducing circulation of the sludge at a high velocity in the manner just described, settling of larger sludge particles in the channels 43 is prevented. Further, the violent agitation and circulation of the sludge causes the circulating sludge to sweep rapidly over the exposed surfaces of the parts of the heating unit 68 which are submerged in the sludge, whereby any solid sludge particles tending to adhere or cling to such surfaces are effectively removed. Thus, in the heating apparatus 29 of the invention the problem of caking of sludge is minimized and avoided for all practical purposes, so that the sludge can readily be heated to higher temperatures than heretofore. By introducing and withdrawing the sludge into and from the channels 43 through openings 44 and 45 which are located approximately at the channel bottoms, the rapid circulation of the sludge accomplished in the channels 43 is further promoted.

In order that efficient absorption of heat by the sludge is accomplished from the heated gases discharged therein, the heating units 68 are submerged a sufficient depth in the sludge so that the heated gases will remain in surface contact with the sludge for an adequate interval of time. When high temperature heating gases at a temperature of about 2200° F. to 2400° F. are discharged into the sludge in the manner described above, for example, and it is desired to heat the sludge to elevated temperatures in the neighborhood of about 120° F., for example, the heating units 68 are desirably positioned to provide a path of flow for the heated gases of such length that the latter will effectively give up heat to the sludge and pass into the gas space above the sludge at temperatures of about 150° F.

It is desirable to withdraw the gases rapidly from the channel spaces and in the embodiment illustrated flues 90 having adjustable dampers 90a are provided at each end of the channels for venting the exhaust gases. The flues 90 are connected to horizontally disposed piping 90b which communicates with a larger vertical flue 90c. Such gases may be withdrawn exteriorly of the enclosure in which the heating apparatus 29 is installed or employed for heating purposes in other parts of the sewage treating plant.

Since it is desirable for efficient operation to utilize all of the heat possible from the heated gases, and the path of flow provided for such gases in the sludge is an important factor in this connection, it is important to maintain the average sludge liquid levels in the channels 43 as constant as possible. It is for this reason that the adjustable discharge spout 58 is provided in the sump 30 which can be moved up or down to maintain the sludge in the channels 43 at a substantially constant depth.

It will now be understood that the discharge spout 58 serves as a single weir for all of the channels 43 and from which heated sludge overflows from the channels by gravity into the sump 30. Hence, adjustment of the sludge liquid levels in all of the channels 43 is accomplished by simply rotating the single hand wheel 62 at the top of the sump 30, as previously described. The vent 57 is provided for the sump 30 to permit the escape of gases which are entrained in the heated sludge passing from the channels 43 into the sump.

To prevent settling of large sludge particles delivered from the sump 30 to the primary digestion tank 22, it is necessary to pass the heated sludge through the conduit 33 at an adequate velocity which is generally in the neighborhood of about 2.5 to 3 feet per second, for example. To maintain such a flow rate it may be necessary to mix additional make-up liquid with the sludge. In order to avoid adding make-up water to the sludge, supernatant liquid passing from the digestion tanks is mixed with the raw sludge passing to the heating apparatus 29. As shown, the supernatant liquid passing from the secondary digestion tank 36 may be diverted from conduit 41 through conduit 91 which communicates with conduit 27 at the inlet side of the pump 26; or supernatant liquid passing from the primary digestion tank 22 may be diverted from the conduit 35 into conduit 92 which in turn is connected to conduit 91.

Suitable valves 93, 94 and 95 may be provided in these conduits to deliver all of the supernatant liquid to conduit 27 from either the primary or secondary digestion tanks or simultaneously from both digestion tanks. If desired, make-up supernatant liquid may be delivered through conduit 91 and conduit 91a directly to the inlet end of manifold 47 rather than to the conduit 27. Suitable valves 91b and 91c may be provided in the conduit 91 and 91a to control the manner in which make-up supernatant liquid is returned to the heating apparatus 29.

The supernatant liquid passing from the secondary digestion tank 36 is at a temperature of about 75° F. and that passing from the primary digestion tank 22 is at a higher temperature. By employing such supernatant liquid as make-up liquid which is mixed with the raw sludge when required, the heat losses in heating apparatus 29 are reduced to a minimum, thereby avoiding the necessity of adding make-up water which not only requires heating from a lower temperature than the supernatant liquid but also increases the amount of supernatant liquid that must be handled in the plant.

Returning supernatant liquid as make-up liquid to be mixed with raw sludge also possesses the advantage that the organic matter present in the supernatant liquid serves to inoculate the raw sludge in its path of flow to the primary digestion tank 22. Since the mixture immediately after it is formed passes into the sludge heating apparatus 29 in which the sludge is heated to the desired elevated temperature, the heating of the organic matter carried into the channels 43 by the supernatant liquid initiates inoculation and seeding of the raw sludge under ideal temperature conditions.

Although not to be limited thereto, the gas produced in the digestion tanks 22 and 36 and passing therefrom into the gas holder 40 may be utilized as the combustion gas in the combustible gas mixture delivered to the heating unit 68. As shown, this may be accomplished with the aid of a gas mixing machine diagrammatically indicated at 96 and like that illustrated in Hess Patent No. 2,243,704, for example. Such a machine may include as component parts thereof a gas pressure regulator 97, a mixing device 98, a centrifugal compressor 99 and an electric motor 100 for driving the compressor.

The gas passes from the gas holder 40 through a conduit 101 to the gas pressure regulator 97 in which the gas is reduced substantially to atmospheric pressure. The mixing device, due to the suction effect produced by the compressor 99, draws in atmospheric air through a conduit 102 and the gas from the gas pressure regulator 97 through a conduit 103. The air and gas are mixed in the device 98 and drawn into the compressor 99 from which the mixture is delivered under pressure through a main conduit 104 and branch conduits 74 to the heating units 68. A manually operable valve 106 is provided in each of the branch conduits 74 to control the delivery of the combustible gas mixture individually to each heating unit 68.

In view of the foregoing, it will now be understood that an improvement has been provided for rapidly heating raw sludge in its path of flow to the digestion tanks at a place of heating which is entirely outside the digestion tanks. By heating the sludge in the manner described, not only is efficient heating accomplished by bringing the gaseous heating medium into direct surface contact with the sludge but the heating medium may be delivered beneath the liquid surface level of the sludge at an extremely high thermal head and at temperatures ranging as high as 2200° F. to 2400° F. In order to keep the heat loss from the heating units at a minimum, the heat insulating lining 80 is provided within each casing 70 at the top and about the side walls thereof.

The temperature to which the raw sludge is heated in the channels 43 is dependent upon a number of factors including the heat radiation losses from the digestion tanks which varies with seasonal changes. Another factor is the type of digestion desired in the digestion tanks, such as, for example, monophilic or thermophilic. The composition of the raw sludge is also a factor. Thus, when grease is present in the raw sludge, it is desirable to heat such sludge to a higher temperature to promote inoculation and seeding of fresh sludge in the digestion tanks.

In any event, the raw sludge passing through the channels 43 can be heated more or less uniformly therein to any desired elevated temperature over a wide temperature range which is not restricted or limited as in prior practice. The temperature to which the raw sludge is heated will depend in each particular case, among other things, upon the heat loss in the delivery line between the heating apparatus 29 and the digestion tanks, and the temperature at which it is desired to introduce the sludge into the digestion tanks to maintain the average sludge heating temperature required therein.

As previously explained, the extent to which the sludge is heated in the heating apparatus 29 can be nicely controlled by connecting the requisite number of channels 43 either in series, parallel, or in any desired series-parallel relation by closing and opening the appropriate valves 46, 48, 54 and 55. In the preferred embodiment the dimensions of the channels 43 are correlated to the size of the single heating unit 68 employed so that rapid circulation and agitation of the sludge is effected throughout the channels to prevent settling of heavy sludge particles.

Although the heating apparatus 29 is so constructed and arranged that adequate control over sludge heating can be obtained, such control may be supplemented, if desired, by additional control provisions in which the delivery of the combustible gas mixture to the heating unit 68 is regulated. Thus, a modulating or proportioning valve diagrammatically indicated at 107 may be connected in the conduit 104 for controlling the delivery of combustible gas mixture responsive to the temperature of the heated sludge passing from the heating apparatus 29.

As diagrammatically illustrated, this may be accomplished by providing a thermal responsive element 108 in the conduit 56 which is connected to any conventional and well known electric control equipment 109 which in turn is connected by conductors 105 to the modulating valve 107 and operable to control the latter to increase the supply of combustible gas mixture to the heating units 68 when the heated sludge passing through the conduit 56 tends to fall below a definite temperature; and to decrease the rate of supply of the combustible gas mixture to the heating units 68 when the heated sludge discharged from the heating apparatus 29 and passing through the conduit 56 tends to rise above the definite temperature.

In addition, the control provision just described may be supplemented by an additional control whereby the valve 107 is also operable responsive to the temperature of the sludge undergoing digestion in the primary digestion tank 22. This may be accomplished by providing a thermal element 110 in the primary digestion tank which is also connected to the electric control equipment 109 in which is embodied a switching device of known type operable to shift the control of the valve 107 from the thermal element 108 to the thermal element 110 when the temperature of the sludge undergoing digestion in the digestion tank 22 falls below a definite value. When the temperature of the sludge in the digestion tank 22 approaches the desired value, the control equipment 109 responds to the thermal element 110 and the switching device just referred to shifts the control of the valve 107 from the thermal element 110 back to the thermal element 108.

It is to be understood that the improvement just described for treating sludge may be employed continuously or intermittently depending upon the size of the sewage treating plant. In order to control and regulate the rate at which raw sludge is delivered by the pump 25 to the sludge storage tanks 23, the rate at which sludge is delivered from the latter to the heating apparatus 29 by the pump 26, and the rate at which heated sludge is delivered from the sump 30 to the primary digestion tank 22 by the pump 31, each of these pumps may be driven by a variable speed electric motor or from an electric motor through a variable speed drive.

As diagrammatically shown, each of the pumps 25, 26 and 31 is arranged to be driven by a separate electric motor 111 provided with an adjustable rheostat 112 in series with a field winding 113 connected across the supply conductors 114 and 115 for varying the motor speeds. The adjustable rheostats 112 may be provided with suitable indicia to indicate the rate at which sludge is pumped by each of the pumps 25, 26 and 31, whereby the individual pumps can be properly adjusted to maintain the desired rate of flow of the sludge in its path of flow to the primary digestion tank 22. By providing such control provisions for the pumps 26 and 31, for example, the speed of the pump 31 can always be adjusted to withdraw heated sludge from the sump 30 at substantially the same rate at which raw sludge is delivered to the heating apparatus 29.

Further, the driving motor 100 for the compressor 99 may also be of a variable speed type, and, as diagrammatically shown, is also provided with an adjustable rheostat 112 connected in series with a field winding 113 connected across supply conductors 114a and 115a. By providing a variable speed electric motor for driving the compressor 99, the speed of the compressor can be regulated to deliver the combustible gas mixture to the heating units 68 at any desired pressure over a wide pressure range.

In order to prevent sludge being drawn through the shells 84 into the combustion chambers 77 of the heating units 68 when the supply of combustible gas mixture to the latter is shut off, provision is made for equalizing the pressures in the combustion chambers 77 and the spaces in the channels 43 above the sludge liquid surface levels. As shown in Fig. 7, this may be accomplished by providing a conduit 116 for each heating unit 68 having one end thereof open to the atmosphere and the opposite end thereof communicating with the interior of the sleeve 81. In each conduit 116 is connected an electro-magnetically operable valve 117 which is connected by conductors 118 to the supply conductors 114a and 115a for the electric motor 100 of the gas mixing machine 96.

When the driving motor 100 for the compressor 99 is energized through the supply conductors 114a and 115a, the electromagnetically operable valves 117 are also energized and closed so that heated products of combustion cannot pass from the sleeves 81 through the conduits 116. When the motor 100 is de-energized and the supply of the combustible gas mixture to the heating units 68 is shut off, the electro-magnetically operable valves 117 are also de-energized and open so that atmospheric air can pass through the conduits 116 into the combustion chambers 77. In this way the pressures in the combustion chambers 77 and in the spaces in the channels 43 above the liquid surface levels are equalized and a partial or negative pressure will not be produced in the combustion chambers 77 when the heating units 68 cool off to cause sludge to be drawn up through the shells 84 into the refractory lined combustion chambers 77.

As previously stated, specific forms of conventional equipment are not shown and such equipment is only diagrammatically illustrated in the drawings. Hence, a conventional primary sedimentation tank 11 may be employed, if desired, which provides for the removal of scum from the top of the raw sewage and the delivery of such scum, together with the sludge, to the sludge storage tanks 23. Also, secondary treatment of the raw sewage may be effected in other ways than that described. Although all of the control valves normally required in the operation of a sewage treatment plant like that illustrated have not been shown, it is to be understood that such valves and other devices for controlling the passage of the sewage materials are inherently a part of the system for treating sludge in accordance with the improvement described herein.

Further, it is clear that certain auxiliary equipment and protective devices not shown normally would be employed which are inherently a part of the combustion system. Thus, any conventional type of flame-failure device would be employed for automatically shutting off the supply of combustible gas mixture to the heating units 68 in the event of combustion failure in the latter. It will be noted that should such combustion failure occur, the sludge only rises in the shells 84 and does not pass into the restricted discharge orifices 83 of the combustion spaces 77.

While a single embodiment of the invention has been shown and described, it will be apparent to those skilled in the art that modifications and changes may be made without departing from the spirit and scope of the invention.

What is claimed is:

1. Apparatus for treating sludge comprising structure providing a substantially closed horizontally extending channel having openings at opposite ends thereof for passing sludge therethrough, a substantially closed vessel connected to receive sludge from the channel, digestion tank means, means including a pump for delivering sludge from the vessel to the digestion tank means, variable speed driving means for the pump, a burner mounted to discharge high temperature products of combustion beneath the liquid surface level of the sludge in the channel, adjustable weir means associated with the channel for regulating the liquid surface level of the sludge in the channel and from which heated sludge overflows by gravity into the vessel, means for withdrawing the gaseous heating medium from the space of the channel above the sludge, means for venting from the vapor space of the vessel gaseous heating medium entrained in the heated sludge passing from the channel, and means for returning supernatant liquid from the digestion tank means to the channel.

2. Apparatus for treating sludge comprising structure providing a substantially closed horizontally extending channel having openings at opposite ends thereof for passing sludge therethrough, digestion tank means, means for passing sludge from the channel to the digestion tank means, a heating unit for said channel comprising means providing a combustion space in which combustion of a combustible gas mixture is accomplished and including an exhaust portion for delivering heated combustion gases beneath the liquid surface level of the sludge in the channel, means including a compressor and a mixing device associated therewith for mixing a combustible gas and air and delivering such mixture under pressure to the combustion space of the heating unit, means for withdrawing the combustion gases from the vapor space of the channel, and means for equalizing the pressures in the combustion space of said heating unit and in the vapor space in the channel when the supply of combustible gas mixture to the heating unit is shut off.

3. Apparatus for heating sludge before the sludge is delivered to a place of digestion comprising structure providing a horizontally disposed elongated channel having openings at opposite ends thereof for passing sludge therethrough, a burner having an exhaust portion thereof immersed in the sludge beneath the liquid surface level of the sludge in the channel for discharging a high temperature gaseous heating medium into the sludge to effect heating thereof, said burner exhaust portion including spaced apart wall members providing a passage extending transversely of the channel for at least a major portion of the distance between the lateral side walls thereof, said wall members having a plurality of discharge ports at the lower ends thereof facing the opposing ends of the channel for discharging the gaseous heating medium into the sludge in a multiplicity of small gas streams, and a roof associated with said wall members and positioned adjacent to the liquid surface level of the sludge to cause the gaseous heating medium rising through the sludge to pass toward the opposing ends of the channel before leaving the sludge to promote circulation of the sludge and prevent settling of solids present therein.

4. Apparatus for treating sludge comprising a plurality of channels having openings at opposite ends thereof for passing sludge therethrough, heating means associated with each of said channels for delivering a high temperature gaseous heating medium beneath the liquid surface levels of the sludge in the channels, digestion tank means, a manifold, conduits connected to said manifold and each channel to deliver raw sludge to the channels a second manifold connected to said tank, conduits between said second manifold and each channel to deliver heated sludge passing therefrom to the digestion tank means, and valve means in said conduits and manifolds operable to connect said channels whereby sludge may pass therethrough either in series, parallel, or in any desired series-parallel arrangement.

5. Apparatus for treating sludge comprising structure providing a plurality of channels having openings at opposite ends thereof for passing sludge therethrough, heating means for each of said channels extending into the sludge in delivering a gaseous heating medium beneath the liquid surface levels of the sludge in the channels, a vessel, a manifold, conduits connected between said manifold and channels to deliver raw sludge to the channels a second manifold connected to said vessel, conduits between said channels and second manifold to deliver heated sludge therefrom to the vessel, valve means associated with said conduits and manifolds operable to connect said channels whereby sludge may pass therethrough either in series, parallel, or in any desired series-parallel arrangement, and a single weir means associated with said second manifold through which heated sludge is delivered from the channels to the vessel for simultaneously controlling the sludge liquid surface levels in the channels, and digestion tank means connected to receive heated sludge from the vessel.

6. Apparatus for treating sludge comprising structure providing a plurality of substantially closed channels having openings at opposite ends thereof for passing sludge therethrough, heating means for each of said channels for delivering a high temperature gaseous heating medium beneath the liquid surface levels of the sludge in the channels, a substantially closed vessel, a manifold, conduits between said manifold and each channel to deliver raw sludge to the channels a second manifold connected to said vessel, conduits between each channel and said second manifold deliver heated sludge therefrom to the vessel, valve means associated with said conduits and manifolds operable to connect said channels whereby sludge may pass therethrough either in series, parallel, or in any desired series-parallel arrangement, means for exhausting gaseous heating medium from the vapor space above the sludge liquid surface level in each of the channels, means for venting from the vessel gaseous heating medium entrained in the heated sludge delivered from the channels to the vessel, adjustable weir means between said second manifold and vessel to regulate the sludge liquid surface levels maintained in the channels and over which liquid passes by gravity into the vessel, and a single control member associated with said weir means for adjusting said weir means to regulate the sludge liquid surface levels in the channels, and digestion tank means connected to receive heated sludge from the vessel.

7. A sludge treating system including structure providing a channel, means communicating with the channel for delivering raw sludge thereto, means for heating sludge in the channel including a burner for effecting combustion of a combustible fuel and means for discharging combustion gases from the burner beneath the liquid surface level of the sludge in the channel, a digestion tank connected to receive heated sludge from the channel, means for supplying a combustible fuel to the burner, valve means to control the supply of fuel, means responsive to the temperature of the heated sludge passing from the channel and means responsive to the temperature of the sludge undergoing digestion in the digestion tank operative to adjust said valve means, said valve means normally being responsive to the temperature of the heated sludge passing from the channel and being operable responsive to the temperature of the sludge undergoing digestion in the digestion tank when the temperature of the sludge in the latter falls below a predetermined value.

8. A sewage treating system comprising structure providing a channel having an inlet and an outlet through which sludge to be treated flows, means to heat the sludge flowing through said channel comprising a burner having a combustion chamber and a discharge port, means to mount said burner so that the discharge port thereof is extending into the channel below the level of the sludge therein whereby heated products of combustion from said combustion chamber will be discharged into the sludge to heat the same, and means attached to said burner extending from the burner over a portion of said channel to direct the products of combustion through the sludge to create a turbulence therein.

9. The combination of claim 8 including means forming a passage between said combustion chamber and the atmosphere whereby the pressure in said chamber may be equalized with that of the atmosphere, and valve means in said passage to control the opening thereof.

FREDERIC O. HESS.
MARCUS B. TARK.
EDWIN R. SCHOFIELD.

REFERENCES CITED

The following references are of record in the file of this patent:

UNITED STATES PATENTS

| Number | Name | Date |
|---|---|---|
| 638,195 | Byrne | Nov. 28, 1899 |
| 649,111 | Schifferle | May 8, 1900 |
| 1,289,378 | Brown | Dec. 31, 1918 |
| 1,652,173 | Lalor | Dec. 13, 1927 |
| 1,716,433 | Ellis | June 11, 1929 |
| 1,929,179 | Piatt | Oct. 3, 1933 |
| 1,930,457 | Pruss | Oct. 10, 1933 |
| 1,989,589 | Fischer et al. | Jan. 29, 1935 |
| 2,123,387 | Tark | July 12, 1938 |
| 2,159,759 | Doennecke et al. | May 23, 1939 |
| 2,190,598 | Fischer | Feb. 13, 1940 |
| 2,297,195 | Behringer | Sept. 29, 1942 |
| 2,358,302 | Brosius | Sept. 19, 1944 |
| 2,359,004 | Schlenz et al. | Sept. 26, 1944 |
| 2,404,223 | Durdin | July 16, 1946 |
| 2,458,163 | Hays | Jan. 4, 1949 |
| 2,538,412 | Cecil et al. | Jan. 16, 1951 |

FOREIGN PATENTS

| Number | Country | Date |
|---|---|---|
| 401,052 | Germany | of 1922 |

OTHER REFERENCES

Water and Sewage Works, June 1946, pages 236-238, "A New Method of Heating Sludge Digesters," by C. E. Keffer.